United States Patent [19]

Wagner et al.

[11] 4,362,433
[45] Dec. 7, 1982

[54] FLOOD DISASTER CONTROL BAG

[76] Inventors: David R. Wagner, c/o George Spector, 3615 Woolworth Bldg., 233 Broadway; George Spector, 3615 Woolworth Bldg., 233 Broadway, both of New York, N.Y. 10007

[21] Appl. No.: 202,371

[22] Filed: Oct. 30, 1980

[51] Int. Cl.³ .............................................. E02B 3/10
[52] U.S. Cl. ...................................... 405/107; 405/18
[58] Field of Search ............................ 405/15, 18–20, 405/25, 107; 52/2; 150/2.1, 2.5; 220/426; 206/219, 221, 602

[56] References Cited

U.S. PATENT DOCUMENTS

| 1,421,857 | 7/1922 | Störe | 405/107 X |
|---|---|---|---|
| 3,191,386 | 6/1965 | Wiegel et al. | 405/25 |
| 3,342,324 | 9/1967 | Piazze | 206/219 |
| 3,374,635 | 3/1968 | Crandall | 405/18 |
| 3,419,134 | 12/1968 | Fitts | 206/221 |
| 3,542,032 | 11/1970 | Spencer | 206/221 X |
| 3,886,751 | 6/1975 | Labora | 405/18 X |
| 3,957,098 | 5/1976 | Hepworth et al. | 405/19 X |
| 4,002,707 | 1/1977 | Oram | 52/2 X |

*Primary Examiner*—David H. Corbin
*Assistant Examiner*—Nancy J. Pistel

[57] ABSTRACT

A weighted water bag for forming levees or dikes, in order to hold back rising flood water, the bag being woven of fiber and including a waterproof or sand inner liner; rings and clips at corners allowing bags to be locked together, a water filler opening at one end, and fiber handles for each side of the opening for easy handling, including forms having portions of the bag filled with sand.

4 Claims, 8 Drawing Figures

U.S. Patent   Dec. 7, 1982   4,362,433
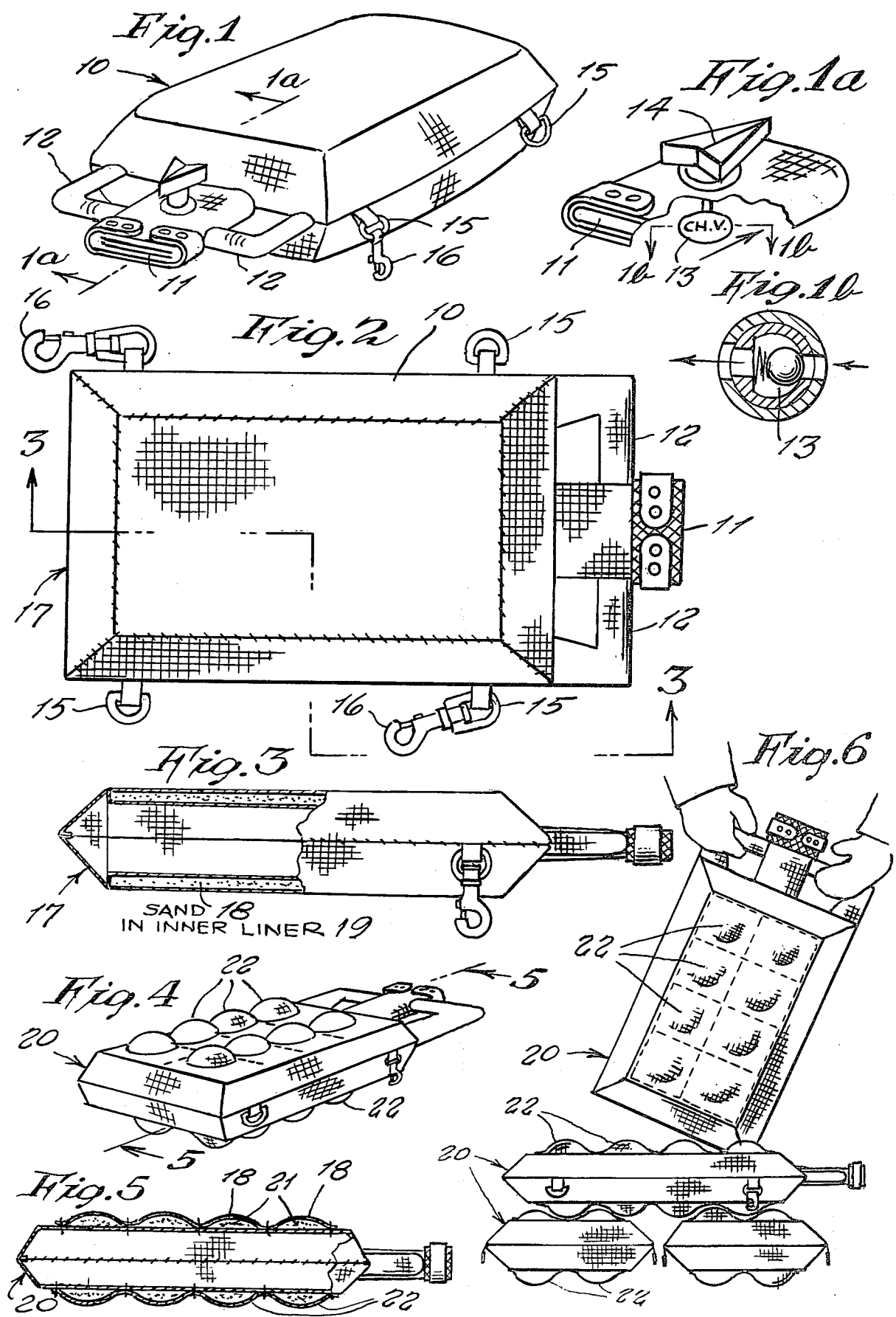

FLOOD DISASTER CONTROL BAG

This invention relates generally to sand bags such as are used to form embankments for flood waters.

It is well known that conventional bags used for such purpose are filled with sand, and piled one upon another so to form the retaining wall. Handling sand is heavy work and time-consuming.

A principal object of the present invention is to provide a flood control bag which differs from conventional sand bags by being not filled with sand, but with the river water which is readily available at an area where an embankment is to be erected, thus eliminating the heavy work of handling sand.

Another object is to provide a flood control bag which is easier filled with water than being filled with sand; the present flood control bag being simply immersed until filled.

Yet another object is to provide a flood control bag which includes rings and clips at corners for locking bags together to form a more rigid wall.

Yet a further object is to provide a flood control bag which, in one design includes cleated outer opposite sides formed of sand bulges for better retaining qualities.

FIG. 1 is a perspective view of one design of the invention.

FIG. 1a is a cross sectional view on line 1a—1a of FIG. 1.

FIG. 1b is a cross sectional view on line 1b—1b of FIG. 1a.

FIG. 2 is a top view thereof.

FIG. 3 is a side view thereof, partly in cross section to illustrate an inner liner for forming an envelope containing a layer of sand between the outer wall and inner liner of the bag, in order to give additional weight to the bag when submerged.

FIG. 4 is a perspective view of another design there of which shows rows of outward bumps on upper and lower sides of the bag so to form cleats that interfit together with those of adjacent bags when stacked.

FIG. 5 is a side cross sectional view thereof showing the bumps being formed by a layer of canvas on each outer side, sand placed therebetween for giving weight, and rows of crossing stitches so to divide the sand into raised bumps.

FIG. 6 shows the bag of FIGS. 5 and 6 being stacked.

Referring now to the drawing in greater detail, and more particularly to FIGS. 1, 1a and 1b thereof at this time, the reference numeral 10 represents a rectangular flood control bag, according to the present invention wherein the same is made of a woven outer fabric for purpose of strength and durability so that the bag is re-usable, and which on its inner side has a waterproof liner. A seal type opening 11 may be made at one end of the bag, and fiber handles 12 are formed adjacent each side of the opening for purpose of conveniently and easily lifting the bag when filled, so to build a dike or embarkment. As shown in FIGS. 1, 1a and 1b, a reversible, one-way check valve 13 may be fitted in the opening, and which is manually turned by a valve handle 14 so to allow water to flow into and fill the bag, when the bag is submerged underwater; and when the valve handle is turned the other way, allows the water to be drained out of th bag when no longer needed. Thus, the bag can be easily filled with readily available water, instead of sand, the check valve holding the water in the bag when forming the dike.

Rings 15 and clips 16 are provided at the bag corners so as to lock the bags together and thus form a rigid structure that cannot be toppled over or washed out as readily as conventional sand bags.

The design of flood control bag 17 shown in FIGS. 2 and 3 is the same as bag 10 except that it does not include the above-described, reversible, one-way, check valve. As shown in FIG. 3, sand 18 may be included in the inner liner 19 in order to add weight to the water-filled bag so that the bag will not float away in a flood, but will remain where placed.

Referring now to FIGS. 4, 5 and 6, another design of flood control bag 20, is the same as the above described bag 10 or 17, except that the sand 18 is confined loosely in small pockets 21 formed between the outer fabric and inner waterproof liner, so that each pocket individually bulges outwardly as shown. Thus each side of the bag is made with a series of outward bulges 22 that serves as cleats by interlocking with similar cleats of adjacent bags, as shown in FIG. 6, thereby making the dike or embarkment still more rigid and resistant to be being pushed over or pulled apart by the force of flood water thereagainst.

Additional uses of these flood control bags are:

(a) CROWD CONTROL—an easily erected barrier for the temporary control of crowds, etc., in which a wall or barrier for the temporary control of crowds, etc., in which a wall or barrier has to be established for restricting, directing or preventing people or persons from access into areas.

(b) VEHICLE CONTROL—an easily erected temporary barrier to close off roads, to direct traffic flow or to serve as an impact barrier around dangerous natural or man made barriers around race tracks, to provide for a more safe barrier for cars should they lose control. The water filled interiors serve as an additional fire preventive quality if punctured on impact, retarding any fire that could otherwise be created in such losses of control.

(c) CHEMICAL CONTROL—an easily and rapidly deployed barrier against chemical spills either on land or in water.

Also the bag could be incorporated in any other mode in which barriers, or walls, temporary or permanent that might be required in any needed situation such uses being within the scope of this invention.

What is claimed as new, is:

1. A flood control bag, comprising in combination, a fabric outer layer and a waterproof inner liner formed into a rectangular bag, an opening in one end of the bag for filing said bag with water, a fabric handle adjacent each side of said opening, and a ring and clip at each corner of said bag; said bag including sand means for weighting said bag, and valve means for said opening.

2. The combination as set forth in claim 1 wherein said sand means comprises sand in said inner liner.

3. The combination as set forth in claim 1, wherein said sand means is confined in pockets between said liner and outer layer forming bumps for interlocking with adjacent similar bags.

4. The combination as set forth in claim 1 wherein said valve means comprises a reversible, one way valve.

* * * * *